United States Patent [19]

Franklin

[11] Patent Number: 5,302,409
[45] Date of Patent: Apr. 12, 1994

[54] REDUCED FAT PEANUT BUTTER AND METHOD OF MAKING SAME

[76] Inventor: Kerin K. Franklin, 3765 Orange La., Boulder, Colo. 80304

[21] Appl. No.: 31,542

[22] Filed: Mar. 15, 1993

[51] Int. Cl.$^5$ ............................................. A23L 1/38
[52] U.S. Cl. ................................... 426/633; 426/518; 426/519; 426/520; 426/578
[58] Field of Search ............... 426/633, 518, 519, 520, 426/578

[56] References Cited

U.S. PATENT DOCUMENTS

| | | | |
|---|---|---|---|
| 2,068,051 | 1/1937 | Canton et al. | 426/632 |
| 3,903,311 | 9/1975 | Billerbeck et al. | 426/331 |
| 4,232,052 | 11/1980 | Nappen | 426/601 |
| 5,079,027 | 1/1992 | Wong et al. | 426/633 |

OTHER PUBLICATIONS

J. M. deMan, *Principles of Food Chemistry,* "Carbohydrates," pp. 160-181, Ontario, Canada, 1990.
W. Heimann, *Fundamentals of Food Chemistry,* "Carbohydrates," pp. 174-183, West Sussex, England, 1980.
P. R. Ashurst, *Food Flavourings,* "Dairy Flavourings," pp. 238-243, Glasgow, Scotland, 1991.
"Butter Buds-Dried Cream Extract, High Concentrate Butter Base," Cumberland Packing Corporation, Racine, Wis.
"Butter Buds 8X," Cumberland Packing Corporation, Food Ingredient Division, Racine, Wis.
"Continuous Westfalia Refining Plant OER," Westfalia Separator AG, Oelde, Germany.
K.-H. Brunner, "New process developments in the field of edible oil refining with centrifugal separators," Westfalia Separator AG, Oelde, Germany.
"Oatrim is Changing the Way American Eats," Con Agra Specialty Grain Products Company, Omaha, Nebr.
"Instant N-Oil® II Technical Service Bulletin," National Starch and Chemical Company, Food Products Division, Bridgewater, N.J.
"Stellar fat replacer structure," A. E. Staley Manuf. Co., Decatur, Ill.
"Stellar fat replacer structure, Handling, Storage, and Preparation," A. E. Staley Manuf. Co., Decatur, Ill.
"Fat Replacement," FMC Corporation, Philadelphia, Pa.
"Fat Replacement Systems," FMC Corporation, Philadelphia, Pa.

*Primary Examiner*—Helen F. Pratt
*Attorney, Agent, or Firm*—Carol W. Burton; Ralph F. Crandell

[57] ABSTRACT

An improved reduced fat peanut butter is obtained by removing oil from ground peanuts, preferably by centrifuging the ground peanuts until a supernatant oil layer is formed above the ground peanuts and separating the ground peanuts from the supernatant oil layer. The resulting peanut paste may then be reground. Maltodextrin and modified food starch are added to and blended with the peanut paste, either before or after the optional regrinding. Salt, butter flavoring and/or peanut flavoring may also be added to and blended with the separated peanuts, either before or after regrinding.

19 Claims, 1 Drawing Sheet

REDUCED FAT PEANUT BUTTER AND METHOD OF MAKING SAME

FIELD OF THE INVENTION

This invention relates to reduced fat foods, and more particularly, to reduced fat peanut butter and a method for producing the same.

BACKGROUND OF THE INVENTION

The public is becoming increasingly aware of the health benefits derived from eating a balanced diet, controlling total food intake and limiting the intake of fats, especially limiting the intake of saturated fats. There is also a fundamental dietary need for protein. Peanuts, cashews, almonds, walnuts, pecans and other nuts, and products made from nuts such as nut butters, are known sources of vegetable protein. Peanuts and peanut butter in particular are popular foods and are an economical source of protein. However, consumption of peanuts and peanut butter is sometimes avoided because of the high fat content of peanuts and peanut butter.

Although the fat content of peanuts varies among peanut varieties and also among crops of a single variety of peanut, fat accounts for approximately 35 to 53 percent by weight of a given batch of peanuts. When peanuts are crushed, roasted and processed into peanut butter, the fat content of the resulting product can average above 50 percent by weight. It is this fat which gives peanut butter much of its texture, mouthfeel and spreadability and some of its peanutty and buttery flavor.

When fat is removed from peanut butter to produce peanut butter lower in fat and calories, the resulting product looses much of its familiar texture, mouthfeel and spreadability. Depending on the fat removal process, the resulting peanut butter also loses some of its flavor. For example, reduced fat peanut butter has been made by pressing peanuts to express oil. While this process may remove from 27 to 32 percent of the fat from peanuts, it is typically an expensive process. In addition, when fat is removed from peanut butter by pressure, water is sometimes added to replace the removed fat. The resultant peanut butter is dry and crumbly and subject to molding.

Natural oil separation methods have also been utilized with peanuts. These processes typically involve extracting fats by agitating and heating ground peanuts and applying absorbent materials to the agitated heated peanuts. Generally less than 9 percent of the oil in the peanuts can be removed by natural oil separation and the elevated temperatures can affect the taste and texture of the resultant peanut butter. In addition, because the fat content of peanuts varies significantly by peanut variety, the amount of fat removed by this method depends on the peanut variety or combination of peanuts in the particular batch being processed, such variability making mass production of a consistent quality reduced fat peanut butter difficult.

It is also possible to extract fat from peanuts by solvent extraction using organic solvents such as hexane. However, solvent extraction methods have not been widely used because of governmental restrictions and concerns about possible toxicity.

In addition to the dictates of consumer taste requiring that reduced fat peanut butter have the texture, mouthfeel, spreadability and flavor of regular peanut butter, reduced fat peanut butter must meet federal statutory and regulatory requirements. In particular, regulations promulgated by the U.S. Food and Drug Administration define the minimum percentage of peanuts which must be present and the maximum percentage of other ingredients which are allowable in commercially marketed peanut butter.

It is against this background that the significant improvements and advancements of the present invention have taken place.

OBJECTS OF THE INVENTION

It is the principal object of the present invention to remove fat from peanuts and produce a reduced fat peanut butter having improved texture and flavor.

It is a further object of the present invention to produce a reduced fat peanut butter having improved stability.

It is a still further object of the present invention to produce a reduced fat peanut butter with reduced calories per gram.

It is a yet further object of the present invention to produce a peanut butter with the aforementioned characteristics consistently in an economical and commercially feasible manner.

SUMMARY OF THE INVENTION

A reduced fat peanut butter composition of the present invention includes ground peanuts from which preferably 6 to 18 percent by weight of oil is removed, and to which are added maltodextrin and modified food starch. Optionally, salt, natural butter flavoring and natural peanut butter flavoring may also be added to the ground peanuts. Grinding the aforementioned ingredients together results in a reduced fat peanut butter of enhanced taste, mouthfeel and functionality. A preferred method of making the reduced fat peanut butter of the present invention involves centrifuging ground peanuts to produce a supernatant oil layer, removing a desired portion of the supernatant oil layer, adding and mixing maltodextrin and modified food starch, and optionally salt, natural butter flavoring and natural peanut butter flavoring, to the ground peanuts from which the oil has been removed. The mixture is then ground to produce the improved reduced fat peanut butter.

DETAILED DESCRIPTION OF THE INVENTION

A reduced fat peanut butter embodying the present invention comprises ground peanuts from which oil is removed and to which are added maltodextrin, modified food starch, salt, natural butter concentrate and natural peanut butter flavoring. An improved texture, flavor and functionality is obtained by mixing these ingredients with the ground peanuts and by further processing the mixture at elevated temperatures. Although the precise chemical reactions are not known, it is believed that an interaction between the starch, maltodextrin and the ground peanuts in the presence of elevated temperatures creates a reduced fat peanut butter with enhanced sweetness, improved mouthfeel and enhanced flavor. (As used herein the terms "fat" and "oil" are equivalent).

EXAMPLE I
Small Scale

Figure 1:
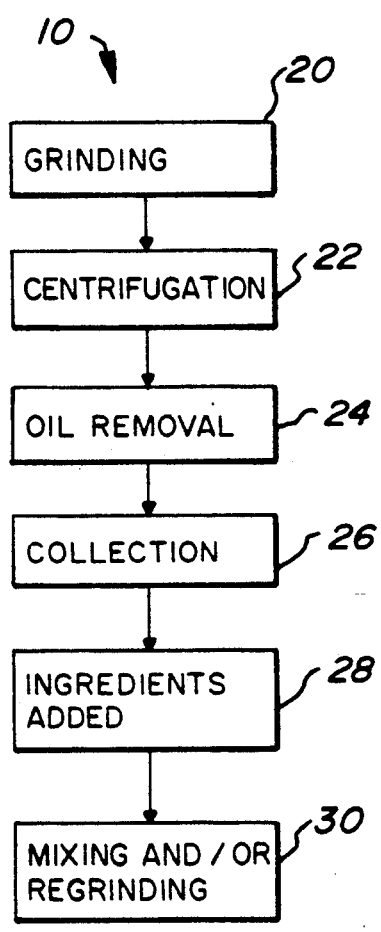
FIG. 1 is a flow chart showing the steps involved in practicing the method embodying the present invention on a small scale.

The flow chart 10 of FIG. 1 illustrates the steps performed to make the reduced fat peanut butter of the present invention on a relatively small scale or laboratory "bench-top" basis. For convenience, each step is referenced by a designated number. Initially, 216.7 grams of previously roasted peanuts containing 38% by weight of fat (or approximately 82.3 grams of fat) from which peanut skins have been removed are collected and placed in a food grinder such as a Morehouse mill. The peanuts are ground in a grinding step 20 by operating the mill for approximately three minutes to obtain ground peanuts of not greater than 1/16" particle size. The friction from the grinding 20 creates considerable heat, and when the desired particle size is achieved, the temperature of the ground peanuts is typically 160° to 170° F.

The ground peanuts are then placed in a centrifuge such as a Sorvall Superspeed model RC2B centrifuge manufactured by DuPont Biotech of Wilmington, Del. The ground peanuts are centrifuged 22 at approximately 4000 revolutions per minute for 30 minutes. In the centrifuging step 22 the ground peanuts are separated into a supernatant layer, comprised primarily of oil (which also may contain some fines), and a lower peanut-containing layer, sometimes referred to herein as a peanut precipitate, which collectively are referred to herein as a peanut paste.

When centrifuging 22 is complete the desired oil is removed (step 24) and the removed oil may optionally be further processed and refined for commercial use or sale. Although from 6 to 18 percent by weight of oil may be removed and a satisfactory product produced, in the present example, 12.18% by weight of oil is removed (26.4 grams of oil), leaving 190.3 grams of peanut paste (i.e. ground peanuts and unremoved supernatant oil.) Since, prior to oil removal the peanuts contained 82.3 grams of fat, the 26.4 gram decrease represents a decrease of 32% of the original fat content (26.4 grams/82.3 grams).

The peanut paste weighing 190.3 grams is collected in a collection step 26, for further processing. Additional ingredients are then added (step 28) to the collected paste. Maltodextrin in the amount of approximately 10.5 grams (5% by weight of the final peanut butter product) is added. The maltodextrin improves organoleptic textural properties of the resulting peanut butter product and contributes in a synergistic manner with the ground peanuts and the other ingredients. Maltodextrins are typically starch decomposition products which have a degree of polymerization of 3 to 20 and a dextrose equivalent of less than 20. In the present example, oat maltodextrin is preferred, with Oatrim−5 TM marketed by Specialty Grain Products Company of Omaha, Nebr. the currently preferred oat maltodextrin. Oatrim−5 TM is added in a dry, white powder form. Oatrim−5 TM is derived from oats in a process developed at the National Center for Agriculture Utilization Research which involves conversion of oat starch in flour to maltodextrins using alpha-amylase enzymes for starch liquefaction, a process known in the art. Like other maltodextrins, Oatrim−5 TM is created by cleaving the starch amylose and amylopectin chains, a process also well known in the art.

Approximately 8.5 grams of a hydrated modified food starch is also added (4% by weight of the final peanut butter product) to the ground peanuts. The modified food starch contributes to the texture of the resulting peanut butter giving it mouthfeel and visual attributes similar to that of regular peanut butter. A currently preferred form of the hydrated modified food starch added as above is hydrated Stellar TM modified starch produced by A. E. Staley Manufacturing Company of Decatur, Ill. Stellar TM is a modified corn starch produced by controlled acid hydrolysis having a primary chemical structure of a branched amylodextrin comprised of anhydro-D-glucopyranose units linked $\alpha$-1,4 in linear regions and $\alpha$-1,6 at branch points. The chemical bonds in Stellar TM modified starch are the same as those present in the original cornstarch. In the present example, an aqueous solution of Stellar TM modified starch containing 25% solids is shear processed prior to its addition to the ground peanuts to produce a creamy, fat-like consistency. Conventional shear processing equipment such as high pressure homogenizers can be used. Preferably the aqueous modified food starch solution is introduced at from 100° to 125° F. and is shear processed at 8000 PSI or above. Details of the shear processing are available from A. E. Staley Manufacturing Company and are well known in the art.

Approximately 1.1 grams of table salt (0.5% by weight of the final peanut butter product) is also added to the ground peanuts. Salt provides both a salty taste and enhances the peanut flavor of the resulting product.

Approximately 0.5 grams (0.25% by weight of the final peanut butter product) of natural concentrated dried butter flavoring is also added to the ground peanuts. The dried butter flavoring contributes and intensifies the creamy, buttery, and smooth sensation otherwise present in the peanut butter. A presently preferred form of the concentrated butter flavoring is Butter Buds 8X TM produced by Cumberland Packing Corporation of Racine, Wis. This product is concentrated and one gram of Butter Buds 8X TM provides butter flavor approximating that of eight grams of butter.

Approximately 0.5 grams (0.25% by weight of the final peanut butter product) of natural peanut butter flavoring with other natural flavors is preferably added to the ground peanuts to enhance the peanut butter flavor of the final product. The natural peanut butter flavoring with other natural flavors replaces some of the oily flavor removed in the oil removal step 24. Natural peanut butter flavorings with other natural flavors are readily commercially available, for example from the Tastemaker Company of Cincinatti Ohio and from Ungerer & Company of Lincoln Park, N.J. The preferred natural peanut butter flavoring product with other natural flavors available from Ungerer & Company is sold as natural peanut butter flavoring WONF. A similar product is available from Tastemaker. Alternatively, both companies also sell a natural peanut butter flavoring without other natural flavors and a natural peanut flavoring (both with and without other natural flavors) which may be substituted for the natural peanut butter flavoring with other natural flavors. Generally, the preferred natural peanut butter flavoring with other natural flavors as well as other commercially available peanut flavorings contain one or more of the following compounds: 2,3,5 trimethyl pyrazine, dimethyl pyrazine, tetrame acid, octanoic acid, caprylic acid, capric acid, linolenic acid, stearic acid, myristic acid, hexenol, benzaldehyde, phenyl acid aldehyde and furals.

After performing the ingredient addition step 28 as described above, the additional ingredients comprise 10% of the weight of the final product of which 90% by weight is ground peanuts.

After the additional ingredients have been added, processing continues in a mixing and/or regrinding step 30. If a more "natural" product is desired, regrinding is omitted and the additional ingredients are stirred or otherwise mixed thoroughly for approximately 5 minutes. To obtain a product of the desired smoothness and homogeneity, the peanut paste and additional ingredients are preferably ground for 5 minutes. If smooth or creamy peanut butter is desired, regrinding stops when 90 percent of the product will pass through a U.S. No. 30 screen. If chunky peanut butter is desired, regrinding stops when at least 5 percent of the product is retained on a U.S. No. 20 screen. At this point, the product temperature is approximately 160° to 180° F. because of the friction inherent in the regrinding step 30. When cool, the reduced fat peanut butter product is suitable for consumption.

The final reduced fat peanut butter product weighs approximately 211.4 grams of which 55.9 grams is fat and thus fat constitutes 26.4% by weight of the final product. The percentage fat in the final reduced fat peanut butter product represents a 30% decrease in fat content from the 38% fat starting material ((38 grams-26.4 grams)/38 grams)). A proximate analysis of the reduced fat peanut butter product produced above are listed below in Table I.

TABLE I

| Calories per 100 grams | 560 |
| --- | --- |
| Carbohydrates | 22.3% by weight |
| Crude fiber | 1.7% by weight |
| Fat | 35.8% by weight |
| Moisture | 5.2% by weight |
| Protein | 33.0% by weight |

The method described above in Example I may be performed on whole, previously roasted peanuts or on commercially available "natural" peanut butter to which additional salt has not been added. If such peanut butter is used as the starting material, the peanut butter is mixed prior to performing the centrifuge step 22, preferably by performing the grinding step 20 on the peanut butter, in part to raise the temperature of the peanut mixture prior to centrifugation. Whether the starting material is ground, roasted peanuts or previously produced peanut butter, the additional ingredient addition step 28 may be performed after the regrinding step 30. If the additional ingredients are added after regrinding, the ingredients must be blended completely with the ground peanuts to produce the desired reduced fat peanut butter.

EXAMPLE II

Commercial Scale

Figure 2:
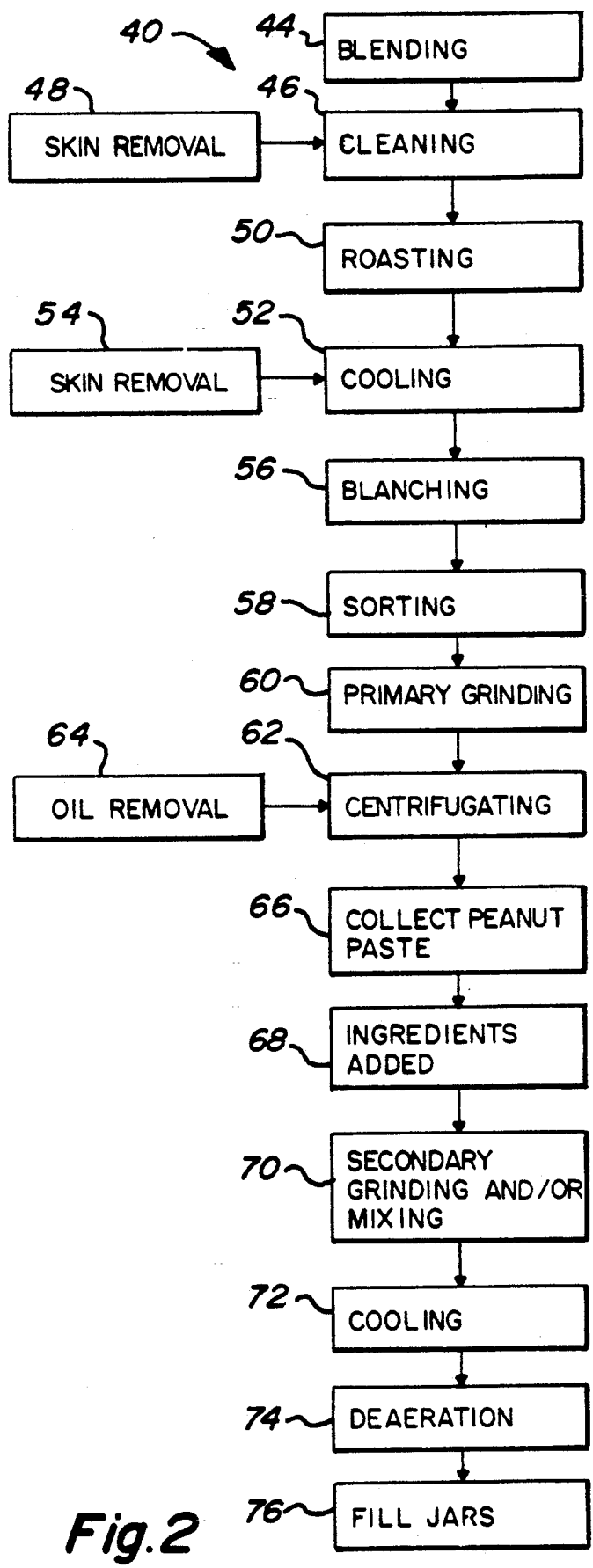
FIG. 2 is a flow chart showing the steps involved in practicing the method embodying the present invention on a commercial scale.

The flow chart 40 of FIG. 2 represents the steps performed to make a reduced fat peanut butter of the present invention on a large, commercial scale, with each step referenced by a designated number. Initially raw nuts are collected and blended 44 to obtain a mixture of peanut butter having the desired taste characteristics and initial fat content.

The blended peanuts are cleaned 46. In the cleaning step 46, foreign articles, including sticks, roots and remnants of the peanut plant are removed. In particular the skins surrounding the peanuts are loosened and removed 48.

The relatively skin free peanut mixture is then transported to an oven for roasting 50, a process well known in the art. When roasting 50 is complete, the roasted peanuts are removed for cooling 52. Skins 54 dislodged during the roasting and cooling steps 50 and 52 are removed and discarded.

The roasted and cooled peanuts are blanched 56. After blanching is complete, the peanuts are sorted 58, both electronically and by visual inspection, and any unblanched peanuts are returned to the blanching stage 56. The blanched peanuts are then ground in a primary grinder 60. The friction of the primary grinding 60 creates heat, and primary grinding is controlled so that the temperature is maintained in the range of about 160° to 170° F.

The ground peanuts are centrifuged in an in-line centrifuge 62. Centrifuges adaptable for this process are commercially available, one illustrative centrifuge being manufactured by Westfalia Separator AG, of Oelde, Germany. Centrifugation 62 is deemed complete when oil equivalent to from 6 to 18 percent by weight of the original peanut product rises to form a supernatant layer.

The desired amount of supernatant oil is removed 64, preferably 13.5%-14.5% by weight of the original peanuts. The material remaining after the oil removal steps 64 includes peanut butter or peanut precipitate and some oil and is referred to herein as a peanut paste.

In accordance with the present invention additional ingredients are then added 68 to the peanut paste. For each 90 parts by weight of the peanut paste, 5 parts by weight of maltodextrin, preferably oat maltodextrin, 4 parts by weight of a hydrated modified food starch, ½ part by weight of salt, ¼ part by weight of dried butter natural flavoring, and ¼ part by weight of natural peanut butter flavoring WONF are added. The resulting product will contain 90 percent peanuts by weight.

The peanut paste with the added ingredients is then ground in a secondary grinder 70 for the length of time required to obtain the desired consistency of the peanut butter, as is well known in the art. Alternatively, the peanut paste may undergo secondary grinding 70 prior to the additional ingredients step 68, in which case the additional ingredients are added to and blended with the reground peanuts. In yet another alternative method, the peanut paste with added ingredients is not reground, but rather undergoes mixing sufficient to create a homogeneous mixture, with such mixing typically taking less than three minutes with a conventional commercial mixer to obtain a product with a more "natural" or gritty texture.

The reduced fat peanut butter is then cooled 72. Cooling is required because the friction generated during secondary grinding heats the peanut butter to above room temperature, preferably at least 160° F. The cooled peanut butter is then deaerated 74, typically by operation of a vacuum pump. The deaerated peanut butter is extruded into jars or other containers 76. Further processing of the containers of peanut butter is well known in the art.

In an alternative formulation to that described in Examples I and II, tapioca maltodextrin, corn maltodextrin or potato maltodextrin is substituted for all or part of the oat maltodextrin. Although the oat maltodextrin provides a superior flavor, tapioca, corn and potato maltodextrin result in an acceptable reduced fat peanut butter at cost lower than the cost when using oat maltodextrin. Currently pregelatinized tapioca maltodextrin such as is marketed under the trademark INSTANT N-OIL II TM produced by National Starch and Chemical Corporation of Bridgewater, N.J., is preferred when substituting tapioca maltodextrin for all or part of the oat maltodextrin in the above described methods. A 30% solution of INTANT N-OIL II TM is added in an amount which constitutes 5% by weight of the final peanut butter product. When a 30% solution of this tapioca maltodextrin is used, the caloric count of the final reduced fat peanut butter is reduced from 9 calories to 1.2 calories for each gram of fat which is replaced by a gram of the tapioca maltodextrin.

The amount of salt added as above in either the small scale or commercial scale methods with or without the specific ingredients listed above may be decreased to produce a lower salt reduced fat peanut butter. Salt of less than 0.25% by weight of the final reduced fat peanut butter product is used to achieve a lower salt product or to compensate if peanuts with a higher salt content are used. To produce a reduced fat peanut butter for persons whose dietary salt intake must be further limited, no additional salt is added during processing.

The natural butter concentrate flavoring added as above in the small or commercial scale methods with or without the specific ingredients listed above and with or without additional salt added may be decreased to less than 0.25% by weight of the final reduced fat peanut butter product, according to the original flavor of the ground peanuts and the taste and functionality desired in the final product. If a stronger butter concentrate flavoring is used, for example Butter Buds 32X TM also marketed by Cumberland Packing Corporation of Racine, Wis., a satisfactory flavor is achieved when the Butter Buds 32X TM constitute 0.1% or less by weight of the final reduced fat peanut butter product. Alternatively, additional butter concentrate flavoring may be omitted entirely to achieve a desired product.

The natural peanut butter flavoring added as above in the small and commercial scale methods described above may be reduced to less than 0.25% by weight of the final reduced fat peanut butter product, according to the original flavor of the ground peanuts and the taste and functionality desired in the final product. Alternatively, peanut butter flavoring may be omitted entirely to achieve a desired product.

Producing reduced fat peanut butter as described above either on a laboratory "bench-top" scale or on a commercial scale results in a reduced fat peanut butter having 90% peanuts with outstanding taste, texture, mouthfeel and product stability. It being understood, however, that the percentage of oil removed during the oil removal steps can be varied to achieve lesser or greater amounts of oil removal, which depend in part on the oil content of the original batch of peanuts.

Presently preferred embodiments of the present invention and many of its improvements have been described with a degree of particularity. It should be understood that this description has been made by way of preferred examples, and that the invention is defined by the scope of the following claims.

What is claimed is:

1. A reduced fat peanut butter composition comprising a mixture of ground peanuts from which oil in an amount of at least 6% by weight of the ground peanuts has been removed, maltodextrin, and modified food starch.

2. A composition of claim 1 wherein the maltodextrin is oat maltodextrin.

3. A composition of claim 2 wherein oil in an amount of at least 12% by weight of the ground peanuts has been removed from the ground peanuts, the oat maltodextrin is approximately 5% by weight of the reduced fat peanut butter, and the modified food starch is approximately 4% by weight of the reduced fat peanut butter.

4. A composition of claim 1 wherein the maltodextrin is tapioca maltodextrin.

5. A composition of claim 1 wherein the maltodextrin is corn maltodextrin.

6. A composition of claim 1 wherein the maltodextrin is potato maltodextrin.

7. A reduced fat peanut butter composition comprising a mixture of ground peanuts from which oil in an amount of 12% to 18% by weight of the ground peanuts has been removed, oat maltodextrin, modified food starch, and natural flavoring chosen from the group consisting of natural butter flavoring and natural peanut butter flavoring, and wherein the ground peanuts are at least 90% by weight of the reduced fat peanut butter.

8. A composition of claim 7 wherein the oat maltodextrin is approximately 5% by weight of the reduced fat peanut butter and the modified food starch is approximately 4% by weight of the reduced fat peanut butter.

9. A method of making a reduce fat peanut butter comprising the steps of:
grinding peanuts to produce ground peanuts having a temperature of about 160° F.;
centrifuging the ground peanuts to produce a supernatant oil layer and a layer of peanut paste;
removing oil in an amount of at least 6% by weight of the ground peanuts from the supernatant oil layer;
adding maltodextrin and a hydrated modified food starch to the peanut paste and to the remaining oil while maintaining the remaining oil and peanut paste at a temperature of least 160° F.; and
mixing the peanut paste, remaining oil and added ingredients to produce the reduced fat peanut butter.

10. The method of claim 9 wherein the oil removed is from 12% to 18% by weight of the ground peanuts.

11. The method of claim 10 wherein the maltodextrin is oat maltodextrin.

12. The method of claim 11 wherein the oat maltodextrin is approximately 5% by weight of the reduced fat peanut butter and the hydrated modified food starch is approximately 4% by weight of the reduced fat peanut butter.

13. The method of claim 12 wherein natural butter flavoring and natural peanut butter flavoring are added to the peanut paste prior to the mixing step.

14. A composition of claim 9 wherein the maltodextrin is tapioca maltodextrin.

15. A composition of claim 9 wherein the maltodextrin is corn maltodextrin.

16. A composition of claim 9 wherein the maltodextrin is potato maltodextrin.

17. A method of making a reduced fat peanut butter comprising the steps of:

grinding peanuts to produce the ground peanuts having a temperature of from 160° to 170° F.;

removing oil in an amount of from 12% to 10% by weight of the ground peanuts from the ground peanuts leaving a peanut paste;

maintaining the peanut paste and remaining oil at a temperature of from 160° to 170° F.;

adding oat maltodextrin, hydrated modified food starch, salt, butter flavoring and peanut butter flavoring to the peanut paste and the remaining oil; and mixing the peanut paste, remaining oil and added ingredients.

18. The method of claim 17 wherein the oat maltodextrin is approximately 5% by weight of the reduced fat peanut butter, the hydrated modified food starch is approximately 4% by weight of the reduced fat peanut butter, the salt is approximately 0.5% by weight of the reduced fat peanut butter, the butter flavoring is approximately 0.25% by weight of the reduced fat peanut butter and the peanut butter flavoring is approximately 0.25% by weight of the reduced fat peanut butter.

19. The method of claim 17 wherein the step of maintaining the peanut paste and remaining oil at a temperature of from 160° to 170° F. comprises grinding the peanut paste and remaining oil.

* * * * *

UNITED STATES PATENT AND TRADEMARK OFFICE
CERTIFICATE OF CORRECTION

PATENT NO. : 5,302,409
DATED : April 12, 1994
INVENTOR(S) : Kerin K. Franklin

It is certified that error appears in the above—identified patent and that said Letters Patent is hereby corrected as shown below:

At column 8, line 61 of the Patent, delete "composition" and substitute therefor --method--.

At column 8, line 34 of the Patent, delete "reduce" and substitute therefor --reduced--.

At column 8, line 63 of the Patent, delete "composition" and substitute therefor --method--.

At column 8, line 65 of the Patent, delete "composition" and substitute therefor --method--.

At column 9, line 3 of the Patent, delete "10%" and substitute therefor --18%--.

Signed and Sealed this

Ninth Day of August, 1994

Attest:

BRUCE LEHMAN

*Attesting Officer*   *Commissioner of Patents and Trademarks*